(12) United States Patent
Sakaguchi et al.

(10) Patent No.: US 11,317,557 B2
(45) Date of Patent: May 3, 2022

(54) AUTOMATIC STEERING SYSTEM AND AUTOMATIC STEERING METHOD

(71) Applicant: Kubota Corporation, Osaka (JP)

(72) Inventors: Kazuo Sakaguchi, Amagasaki (JP);
Tomohiko Sano, Amagasaki (JP);
Osamu Yoshida, Amagasaki (JP);
Satoshi Maruo, Amagasaki (JP);
Takashi Nakabayashi, Sakai (JP);
Tetsuya Nakajima, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 16/763,586

(22) PCT Filed: Nov. 16, 2018

(86) PCT No.: PCT/JP2018/042394
§ 371 (c)(1),
(2) Date: May 13, 2020

(87) PCT Pub. No.: WO2019/123923
PCT Pub. Date: Jun. 27, 2019

(65) Prior Publication Data
US 2020/0359549 A1    Nov. 19, 2020

(30) Foreign Application Priority Data

Dec. 18, 2017 (JP) .............................. JP2017-242052
Dec. 21, 2017 (JP) .............................. JP2017-245499

(51) Int. Cl.
*A01B 69/00* (2006.01)
*A01B 69/04* (2006.01)
*G05D 1/02* (2020.01)

(52) U.S. Cl.
CPC .......... *A01B 69/008* (2013.01); *A01B 69/002* (2013.01); *G05D 1/0278* (2013.01); *A01B 69/001* (2013.01)

(58) Field of Classification Search
CPC .................................................... A01B 69/008
See application file for complete search history.

(56) References Cited

U.S. PATENT DOCUMENTS 8,577,558 B2 * 11/2013 Mitchell .............. A01B 69/004
701/50
9,374,939 B2 * 6/2016 Pickett ................... G05D 1/021
(Continued)

FOREIGN PATENT DOCUMENTS

JP    H06121603 A    5/1994
JP    07064635 A  *  3/1995
(Continued)

*Primary Examiner* — Shelley Chen
(74) *Attorney, Agent, or Firm* — The Webb Law Firm

(57) ABSTRACT

An automatic steering system for a work vehicle includes: a steering travel apparatus for performing leftward turning based on a leftward steering amount with respect to a straight-forward direction and performing rightward turning based on a rightward steering amount with respect to a neutral position; a subject vehicle location calculator for calculating a location of a subject vehicle; a locational shifting calculator for calculating locational shifting from the travel route and the location of the subject vehicle; a vehicle body direction calculator for calculating a vehicle body direction that indicates a direction of a vehicle body; a directional shifting calculator for calculating directional shifting from the travel route and the vehicle body direction; a steering amount calculator for calculating a first steering amount, which is a steering amount for correcting the locational shifting and the directional shifting, based on the locational shifting and the directional shifting; and a steering amount limiter for limiting the first steering amount based (Continued)

on a second steering amount, which is the steering amount at present.

9 Claims, 10 Drawing Sheets

(56) References Cited

U.S. PATENT DOCUMENTS

| | | | |
|---|---|---|---|
| 2004/0186644 A1 | 9/2004 | McClure et al. | |
| 2010/0256871 A1* | 10/2010 | Mitchell | G05D 1/021 701/42 |
| 2013/0304300 A1* | 11/2013 | Peake | G05D 1/0217 701/23 |
| 2016/0057921 A1* | 3/2016 | Pickett | G05D 1/021 701/41 |
| 2017/0297621 A1 | 10/2017 | Bunderson et al. | |
| 2018/0059682 A1* | 3/2018 | Thode | B60W 40/105 |
| 2019/0027042 A1* | 1/2019 | Fujishima | B60W 30/06 |
| 2019/0106149 A1* | 4/2019 | Kunihiro | B60W 30/12 |
| 2019/0133023 A1 | 5/2019 | Iwami et al. | |

FOREIGN PATENT DOCUMENTS

| | | | |
|---|---|---|---|
| JP | 9215406 A | | 8/1997 |
| JP | 2001225744 A | | 8/2001 |
| JP | 2002182746 A | * | 6/2002 |
| JP | 2002182746 A | | 6/2002 |
| JP | 2002358122 A | | 12/2002 |
| JP | 2016011024 A | | 1/2016 |
| JP | 2017123804 A | * | 7/2017 |
| JP | 2017123804 A | | 7/2017 |
| JP | 2017136015 A | | 8/2017 |
| JP | 2017153438 A | | 9/2017 |
| WO | 2017208306 A1 | | 12/2017 |

* cited by examiner

Fig.12
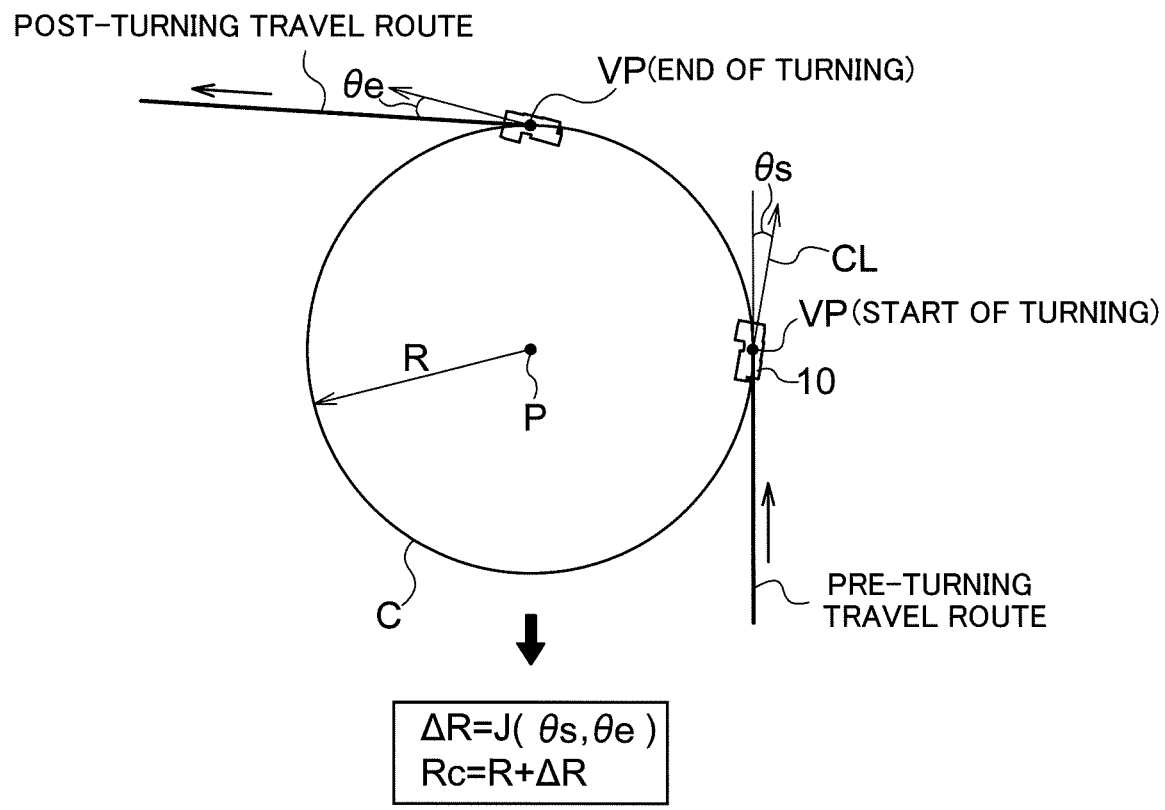
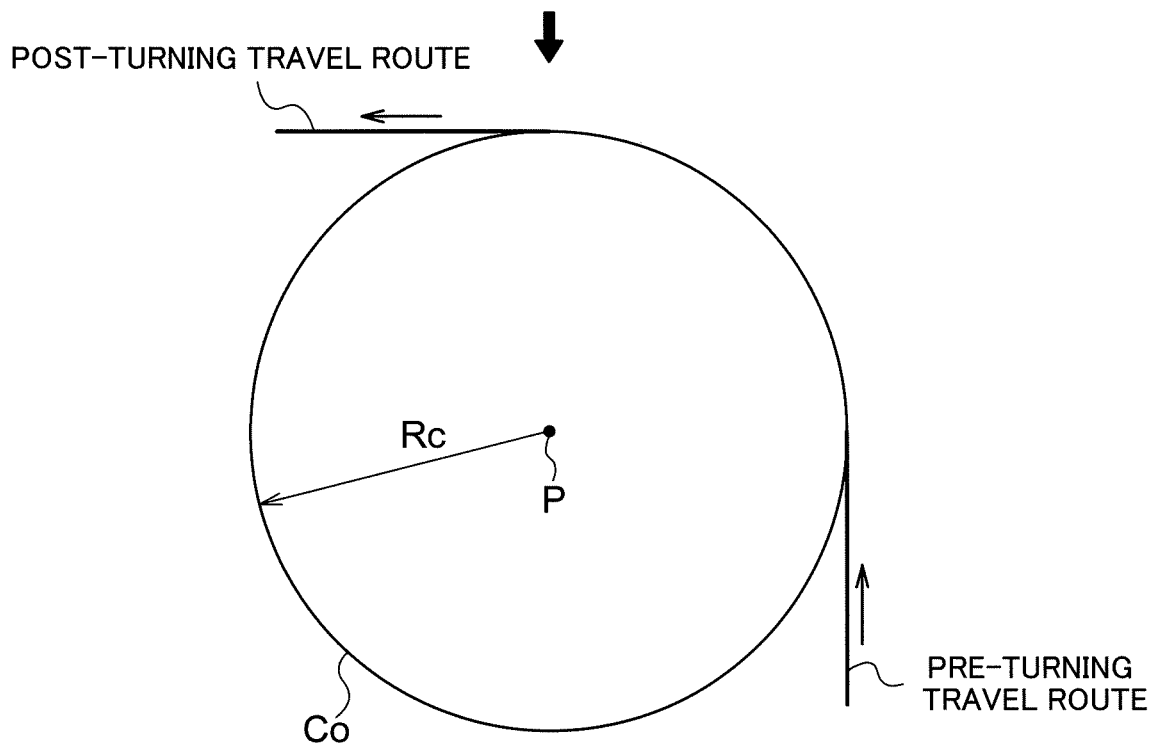

AUTOMATIC STEERING SYSTEM AND AUTOMATIC STEERING METHOD

CROSS-REFERENCE TO RELATED APPLICATIONS

This application is the United States national phase of International Application No. PCT/JP2018/042394 filed Nov. 16, 2018, and claims priority to Japanese Patent Application Nos. 2017-242052 filed Dec. 18, 2017 and 2017-245499 filed Dec. 21, 2017, the disclosures of which are hereby incorporated by reference in their entirety.

TECHNICAL FIELD

The present invention relates to an automatic steering system and an automatic steering method for a work vehicle that automatically travels in a work site.

BACKGROUND ART

A work vehicle disclosed in Patent Document 1 includes a steering means for operating front steering wheels that change a traveling direction of a vehicle body, a route setting means for setting a target travel route along which the vehicle body is to travel, a location detecting means for detecting the location of the subject vehicle, a direction detecting means for detecting the direction in which the vehicle body faces, and a controlling means. This controlling means executes an automatic steering control for operating the steering means such that the location of the subject vehicle is located on the target travel route and the detected direction extends in a target direction on the target travel route.

An agricultural work vehicle disclosed in Patent Document 2 includes a GPS receiving apparatus for receiving radio waves from a GPS satellite, and automatically travels based on its own calculated location so as to follow the target route. In the case of straight-forward travel, if the vehicle body deviates from the linear target route, that is, a control reference point provided on the center line of the vehicle body deviates from the target route, steering control is performed based on the locational deviation (locational shifting) and the directional deviation (directional shifting). In the case of turning travel, the center between the front wheels located on the front side of the vehicle is set as a control reference position, and the locational deviation and the directional deviation of the control reference position with respect to a tangent vector of the vehicle body that passes through an intersection point at which the turning route and a straight line connecting the center of the turning route and the control reference position intersect each other are calculated. The steering control is performed based on the calculated locational deviation and directional deviation.

PRIOR ART DOCUMENTS

Patent Documents

Patent Document 1: JP 2017-123804A
Patent Document 2: JP 2002-358122A

DISCLOSURE OF THE INVENTION

Problem to be Solved by the Invention

However, with conventional steering control, there are cases where the control based on the shifting amount cannot be accurately performed. For example, in the case of the work vehicle disclosed in Patent Document 1, if the detected direction is significantly shifted from the target direction, the steering control is performed with a large steering angle in order to correct the shifting. Accordingly, when the steering is turned by an excessively large steering angle, the steering control is performed so as to turn the steering by a large steering angle in a reverse direction, and thus turning travel cannot be smoothly performed due to repeated control overshoot, which is disadvantageous. In particular, in the case of turning travel in which the vehicle body changes its direction, the target direction changes from moment to moment. Therefore, the degree of control overshoot tends to increase, and thus it is difficult to perform smooth turning travel.

In view of such circumstances, there is demand for an automatic steering system in which control overshoot is suppressed.

With the steering control disclosed in Patent Document 2, a tangent vector of the vehicle body that passes through an intersection point at which the turning route and a straight line connecting the turning center of the turning route and the control reference position intersect each other needs to be calculated to determine the locational deviation (locational shifting amount) and the directional deviation (directional shifting amount), but the computing load for calculating a tangent vector is large, which results in a long computing time. Moreover, the turning radius of a work vehicle is smaller than that of a passenger vehicle and the like, and therefore, the tangent vector changes at a rapid pace in turning travel. Accordingly, the calculation of a tangent vector, which involves a large computing load, needs to be performed in a short period of time. To achieve this, a high-cost computing function is required.

In view of such circumstances, there is demand for an automatic steering system with which a locational shifting amount and a directional shifting amount can be calculated with simple arithmetic at a high speed to perform accurate steering control in turning travel.

An object of the present invention is to perform accurate steering control to solve the aforementioned problems.

Means for Solving Problem

An automatic steering system according to an embodiment of the present invention is an automatic steering system for a work vehicle that automatically travels along a predetermined travel route on a work site, the system including a steering travel apparatus for performing leftward turning based on a leftward steering amount with respect to a straight-forward direction and performing rightward turning based on a rightward steering amount with respect to the straight-forward direction; a subject vehicle location calculator for calculating a location of a subject vehicle; a locational shifting calculator for calculating locational shifting from the travel route and the location of the subject vehicle; a vehicle body direction calculator for calculating a vehicle body direction that indicates a direction of a vehicle body; a directional shifting calculator for calculating directional shifting from the travel route and the vehicle body direction; a steering amount calculator for calculating a first steering amount, which is the steering amount for correcting the locational shifting and the directional shifting, based on the locational shifting and the directional shifting; and a steering amount limiter for limiting the first steering amount based on a second steering amount, which is the steering amount at present.

An automatic steering method according to an embodiment of the present invention is an automatic steering method for a work vehicle that automatically travels along a predetermined travel route in a work site, the method including a step of calculating a location of a subject vehicle; a step of calculating locational shifting from the travel route and the location of the subject vehicle; a step of calculating a vehicle body direction that indicates a direction of a vehicle body; a step of calculating directional shifting from the travel route and the vehicle body direction; a step of calculating a first steering amount, which is a steering amount for correcting the locational shifting and the directional shifting, based on the locational shifting and the directional shifting; a step of limiting the first steering amount based on a second steering amount, which is the steering amount at present; and a step of steering the work vehicle in accordance with the limited first steering amount.

With these configurations, the steering amount calculated to correct the locational shifting and the directional shifting is limited by the steering amount limiter, and therefore, a steering operation executed with such a large steering amount that would enable the shifting to be corrected all at once is avoided. Accordingly, repeated control overshoot is suppressed, and turning travel is performed smoothly.

In one of the favorable embodiments of the automatic steering system of the present invention, the steering amount limiter prohibits the steering amount calculator from calculating a steering amount causing a change from one side of left and right sides to the other side of the left and right sides over the straight-forward direction. Similarly, in one of the favorable embodiments of the automatic steering method of the present invention, when the first steering amount is limited, a steering amount causing a change from one side of left and right sides to the other side of the left and right sides over the straight-forward direction is prohibited. With these configurations, reverse steering, that is, a change in the steering state from a leftward steering state to a rightward steering state, or from a rightward steering state to a leftward steering state, is prohibited. Therefore, such an excessive steering operation that causes large-scale oscillation of the vehicle body is suppressed, and the directional shifting is smoothly corrected.

In the case where the vehicle is traveling along a turning travel route on which the vehicle body changes its direction, the direction in which the travel route extends, which is a target direction, changes from moment to moment as the vehicle travels. Therefore, if a steering amount calculated to simply correct the directional shifting at a point in time is used as in the conventional case, the degree of control overshoot will increase compared with the straight-forward travel, and thus it is difficult to perform smooth travel. Accordingly, one of the favorable embodiments of the automatic steering system of the present invention is configured such that the first steering amount is limited by the steering amount limiter when the travel route is a turning travel route. Similarly, one of the favorable embodiments of the automatic steering method of the present invention is configured such that the step of limiting the first steering amount is performed when the travel route is a turning travel route. As a result, an excessive steering operation is suppressed in the turning travel.

Furthermore, if the vehicle body is present on the inner side of the turning route during the turning travel, control overshoot of the steering control is likely to increase in magnitude due to the turning travel route extending close to the vehicle body. Accordingly, one of the favorable embodiments of the present invention is configured such that the first steering amount is limited by the steering amount limiter when the location of the subject vehicle is present inside a turning route of the turning travel route, and the first steering amount is not limited by the steering amount limiter when the location of the subject vehicle is present outside the turning route of the turning travel route. Limiting a travel state in which a steering amount is limited makes it possible to obtain appropriate turnability.

In the case where the vehicle is traveling on a slippery travel surface, an uneven travel surface, and the like, locational shifting and directional shifting of the vehicle body occur suddenly, and therefore, if a steering amount is limited, such locational shifting and directional shifting cannot be managed. In such a case, reducing the vehicle speed as a temporary emergency measure is preferable for stable travel. Accordingly, one of the favorable embodiments of the automatic steering system of the present invention includes a limitation remover for removing a limitation applied to the first steering amount by the steering amount limiter, wherein the limitation remover removes the limitation on the first steering amount and outputs a vehicle speed reduction instruction at the same time. Similarly, in one of the favorable embodiments of the automatic steering method of the present invention, removing a limitation on the first steering amount and outputting a vehicle speed reduction instruction are performed at the same time.

A steering travel apparatus for a work vehicle is based on a method in which steerable wheels are used and a vehicle body is steered by controlling the steering angles of the steerable wheels, or a method in which left and right travel units (wheels or crawlers) whose speeds can be independently controlled are used and a vehicle body is steered by utilizing a difference in the speed between the left travel unit and the right travel unit. With the latter method, steering can be performed such that the direction of the vehicle body is abruptly changed, but the steering control thereby tends to be excessive. Accordingly, limiting a steering amount as described above is suitable for the latter method.

An automatic steering system according to an embodiment of the present invention is an automatic steering system for a work vehicle that automatically travels along a predetermined turning circle, the system including a reference point calculator for calculating a location of a reference point of the work vehicle; a reference straight line calculator for calculating, as a reference straight line, a straight line that passes through the center of the turning circle and the reference point; a locational shifting amount calculator for calculating, as a locational shifting amount, a distance between the reference point and an intersection point at which the reference straight line and the turning circle intersect each other; a vehicle body direction calculator for calculating a vehicle body direction that indicates a direction of the vehicle body of the work vehicle; a directional shifting amount calculator for calculating, as a directional shifting amount, an intersection angle between the vehicle body direction and a line that passes through the reference point and is orthogonal to the reference straight line; and a steering controller for outputting a first steering amount that reduces the locational shifting amount and the directional shifting amount. Moreover, an automatic steering method according to an embodiment of the present invention is an automatic steering method for a work vehicle that automatically travels along a predetermined turning circle, the method including a step of calculating a location of a reference point of the work vehicle; a step of calculating, as a reference straight line, a straight line that passes through the center of the turning circle and the reference point; a step of calculating, as a locational shifting amount, a distance between the reference point and an intersection point at which the reference straight line and the turning circle intersect each other; a step of calculating a vehicle body direction that indicates a direction of the vehicle body of the work vehicle; a step of calculating, as a directional shifting amount, an intersection angle between the vehicle body direction and a line that passes through the reference point and is orthogonal to the reference straight line; a step of outputting a first steering amount that reduces the locational shifting amount and the directional shifting amount; and a step of steering the work vehicle in accordance with the first steering amount. Such steering can be performed during forward travel and rearward travel.

It should be noted that the turning circle as used herein is not limited to an exact circle, and encompasses an approximate circle as well as a turning circle in which the center changes and thus the radius changes in a very short time.

With these configurations, a straight-line equation of a reference straight line connecting the center of the turning circle, which is a predetermined traveling target, and the reference point of the work vehicle is calculated, and using this reference straight line makes it possible to calculate a locational shifting amount and a directional shifting amount with simple arithmetic without determining the straight-line equation of a tangent. In other words, a locational shifting amount is a distance (length) between the reference point and an intersection point at which the reference straight line and the turning circle intersect each other. A directional shifting amount is an angle between a straight line that passes through the reference point and is orthogonal to the reference straight line, and a straight line that is calculated by the vehicle body direction calculator and represents the direction of the vehicle body. The obtained locational shifting amount and the directional shifting amount are input to the steering controller to determine a steering amount.

As described above, with the above-mentioned configuration, a locational shifting amount and a directional shifting amount can be determined using simple calculations, thus making it possible to provide an automatic steering system that can calculate a locational shifting amount and a directional shifting amount with simple arithmetic at a high speed and thus perform accurate steering control in turning travel.

The length between the reference point and an intersection point at which the reference straight line and the turning circle intersect each other, which is a locational shifting amount, is a difference between the radius of the turning circle and a length from the center of the turning circle to the reference point. Accordingly, in one of the favorable embodiments of the automatic steering system of the present invention, the locational shifting amount calculator calculates the distance by subtracting the radius of the turning circle from a length of a portion of the reference straight line between the center of the turning circle and the reference point. Similarly, in one of the favorable embodiments of the automatic steering method of the present invention, when the locational shifting amount is calculated, the distance is calculated by subtracting the radius of the turning circle from a length of a portion of the reference straight line between the center of the turning circle and the reference point.

In one of the favorable embodiments of the automatic steering system of the present invention, the steering controller computes the first steering amount through a PID control method or PI control method using a second steering amount, which is a current steering amount, the locational shifting amount, and the directional shifting amount as input parameters, and outputs the first steering amount. Similarly, in one of the favorable embodiments of the automatic steering method of the present invention, when the first steering amount is output, the first steering amount is computed through a PID control method or PI control method using a second steering amount, which is a current steering amount, the locational shifting amount, and the directional shifting amount as input parameters, and output. With these configurations, control hunting is suppressed, and thus the turning travel of the work vehicle is performed smoothly. Accordingly, damage to a farm field due to turning is suppressed.

In one of the favorable embodiments of the present invention, the turning circle is set such that an arc connects a pre-turning travel route and a post-turning travel route that extend in different directions, and a turning circle for quick turning and a turning circle for slow turning are prepared so as to be capable of being selected as the turning circle. With this configuration, turning travel using a more appropriate turning circle can be selected depending on the state of the farm field or the travel state.

In one of the favorable embodiments of the present invention, the radius of a turning circle set in a subsequent instance of turning travel is adjusted based on a turning travel error in a previous instance of turning travel. With this configuration, if the work vehicle travels on a route that significantly bulges outward from an arc of the turning circle, which is a target route, due to the state of the farm field that impairs the turnability of the work vehicle, for example, selecting a turning circle with a larger radius for turning next time and onward makes it possible to perform smooth travel along the arc of the turning circle.

BRIEF DESCRIPTION OF THE DRAWINGS

FIG. 12 is a schematic diagram showing another embodiment of the turning control.

BEST MODES FOR CARRYING OUT THE INVENTION

In the following description, a normal combine harvester will be described as an example of an operating machine that employs an automatic steering system of the present invention and can automatically travel. It should be noted that, in this specification, the "front side" (a side indicated by arrow F shown in FIG. 1) means the front side in the front-rear direction (traveling direction) of a vehicle body and the "rear side" (a side indicated by arrow B shown in FIG. 1) means the rear side in the front-rear direction (traveling direction) of a vehicle body unless otherwise stated. Moreover, the left-right direction or the horizontal direction means the transverse direction of a vehicle body (the width direction of a vehicle body) that is orthogonal to the front-rear direction of the vehicle body. The positional relationship between the "upper side" (a side indicated by arrow U shown in FIG. 1) and the "lower side" (a side indicated by arrow D shown in FIG. 1) is the positional relationship in the vertical direction (perpendicular direction) of the vehicle body, and refers to the relationship regarding the height from the ground.

Figure 1:
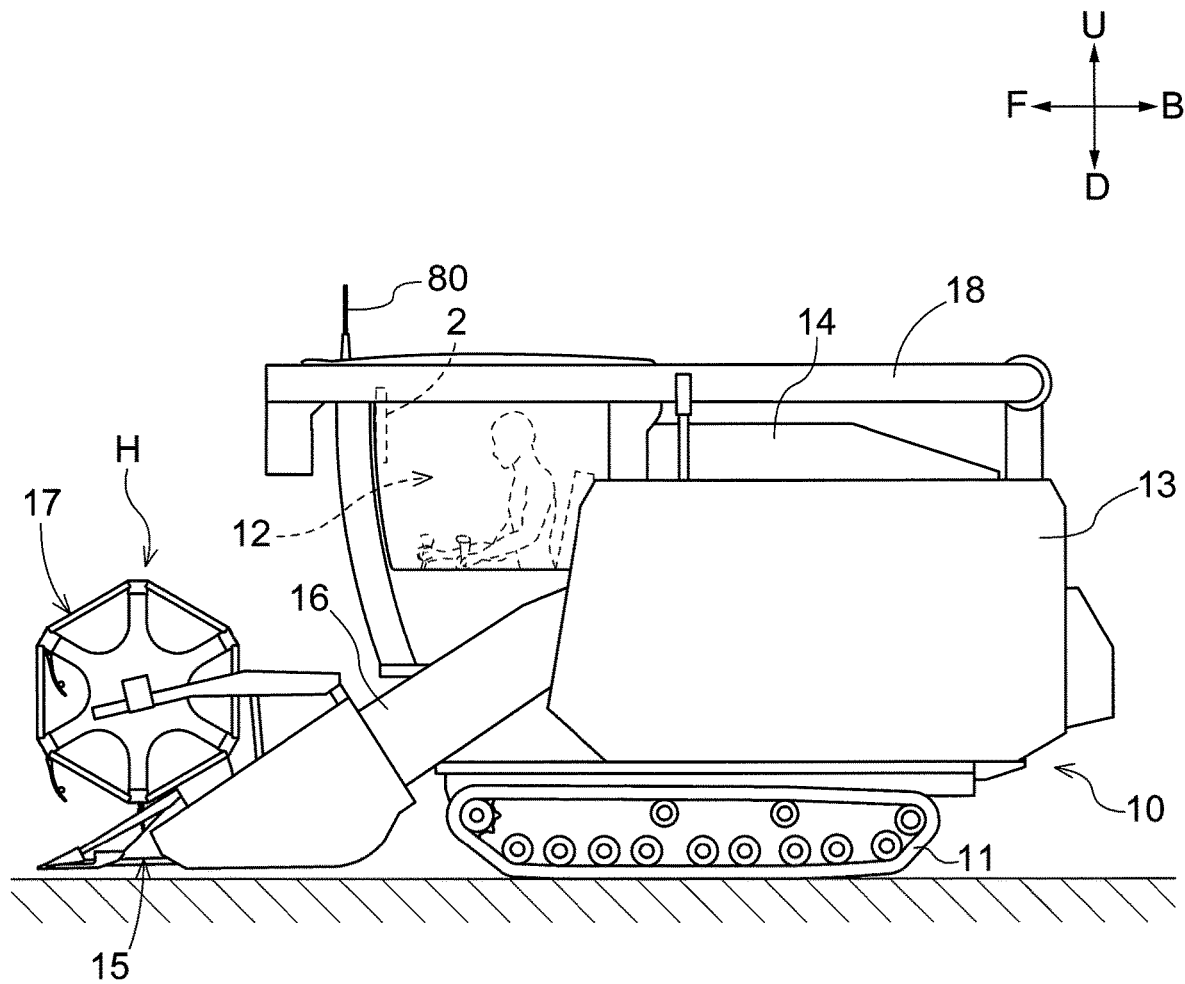
FIG. 1 is a side view of a combine harvester that is an example of a work vehicle provided with an automatic steering system.

As shown in FIG. 1, this combine harvester includes a traveling vehicle body 10, a crawler-type travel apparatus 11, a driving portion 12, a threshing apparatus 13, a grain tank 14, a harvesting portion H, a transport apparatus 16, a grain discharge apparatus 18, and a subject vehicle location detection module 80.

The travel apparatus 11 is provided on the lower side of the traveling vehicle body 10 (referred to merely as "vehicle body 10" hereinafter). The combine harvester is configured to be a self-propelled harvester because it is provided with the travel apparatus 11. This travel apparatus 11 is a steering travel apparatus including a pair of left and right crawler mechanisms (travel units). The crawler speed of the left crawler mechanism (left travel unit) and the crawler speed of the right crawler mechanism (right travel unit) can be independently adjusted, and the direction in which the vehicle body 10 faces when traveling can be changed by adjusting this speed difference. The driving portion 12, the threshing apparatus 13, and the grain tank 14 are provided on the upper side of the travel apparatus 11, and form the upper portion of the vehicle body 10. A driver who drives the combine harvester or a supervisor who supervises the work conducted by the combine harvester can get in the driving portion 12. Usually, the driver also serves as the supervisor. It should be noted that, when separate persons serve as the driver and the supervisor, the supervisor may supervise the work conducted by the combine harvester from outside the combine harvester.

The grain discharge apparatus 18 is coupled to the lower rear portion of the grain tank 14. The subject vehicle location detection module 80 is attached to the upper front portion of the driving portion 12.

The harvesting portion H is provided at the front portion of the combine harvester. The transport apparatus 16 is connected to the rear side of the harvesting portion H. The harvesting portion H includes a cutting mechanism 15 and a reel 17. The cutting mechanism 15 reaps planted grain culms on the farm field. The reel 17 rakes the planted grain culms to be harvested while rotating. With this configuration, the harvesting portion H harvests cereals (one type of crop) in the farm field. The combine harvester can travel using the travel apparatus 11 while harvesting cereals in the farm field using the harvesting portion H. In other words, work travel can be performed.

The reaped grain culms reaped by the cutting mechanism 15 are transported to the threshing apparatus 13 by the transport apparatus 16. The reaped grain culms are threshed by the threshing apparatus 13. Grains obtained through a threshing process are stored in the grain tank 14. The grains stored in the grain tank 14 are discharged to the outside of the combine harvester by the grain discharge apparatus 18.

A communication terminal 2 is arranged in the driving portion 12. In this embodiment, the communication terminal 2 is fixed to the driving portion 12. However, the present invention is not limited to this configuration, and a configuration may also be employed in which the communication terminal 2 can be attached to and detached from the driving portion 12. The communication terminal 2 may be taken out of the combine harvester.

Figure 2:
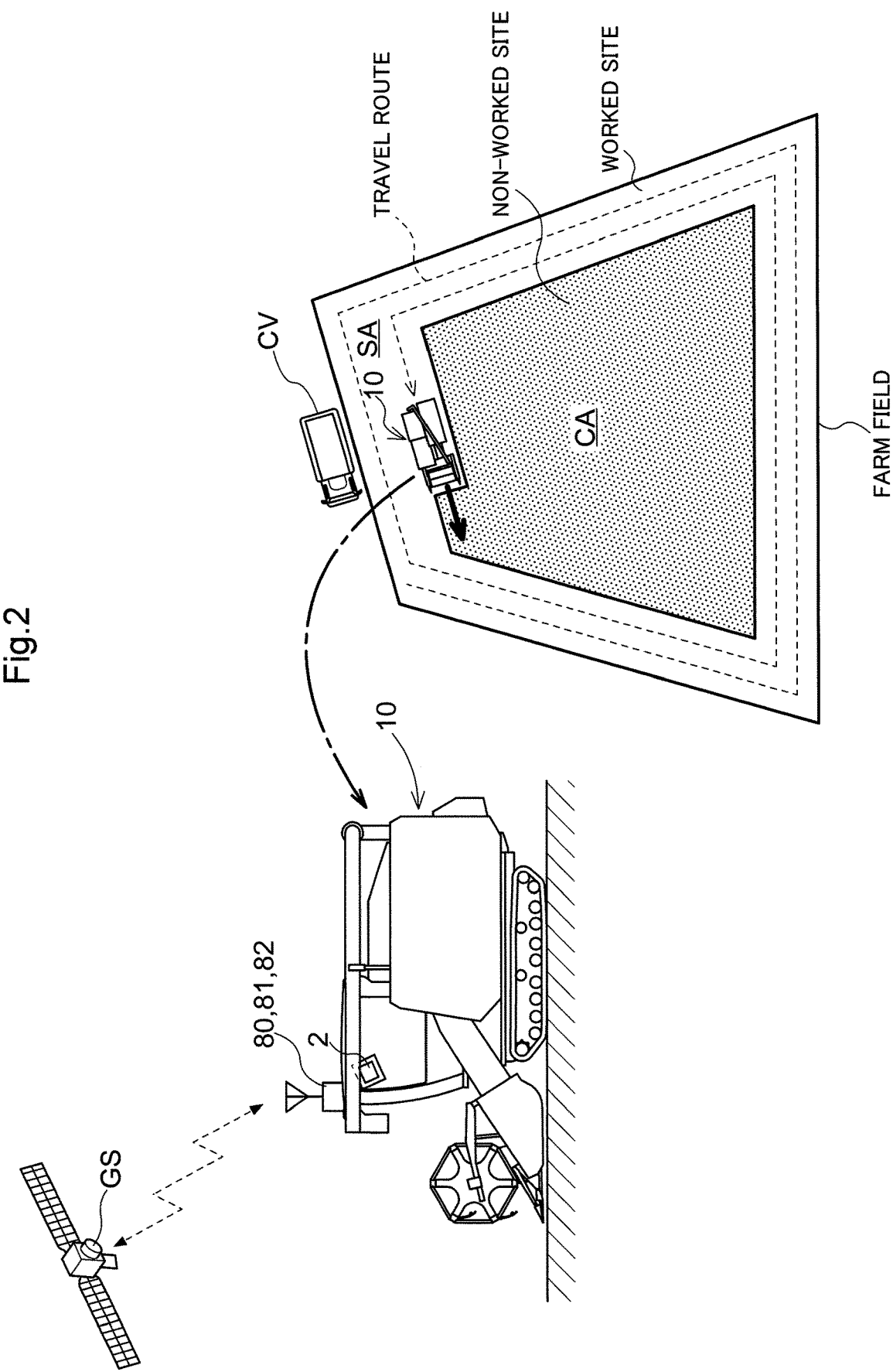
FIG. 2 is a diagram showing an outline of automatic traveling of the combine harvester.

As shown in FIG. 2, this combine harvester automatically travels along a predetermined travel route on a farm field. This requires information regarding the location of the subject vehicle. The subject vehicle location detection module 80 includes a satellite navigation module 81 and an inertial navigation module 82. The satellite navigation module 81 receives GNSS (Global Navigation Satellite System) signals (including GPS signals) from an artificial satellite GS and outputs positioning data for calculating the location of the subject vehicle. A gyro acceleration sensor and a magnetic direction sensor are integrated in the inertial navigation module 82, and the inertial navigation module 82 instantaneously outputs a position vector indicating a traveling direction. The inertial navigation module 82 is used to complement the calculation of the location of the subject vehicle performed by the satellite navigation module 81. The inertial navigation module 82 may also be arranged at a location separate from that of the satellite navigation module 81.

The procedure of harvesting work conducted using this combine harvester on a farm field is as described below.

First, a driver-cum-supervisor manually operates the combine harvester to perform harvesting travel such that the combine harvester circles along the border of a farm field in the outer peripheral region of the farm field as shown in FIG. 2. The area that has become a reaped area (worked site) through this process is set as an outer peripheral area SA. An area that remains as a non-reaped area (non-worked site) inside the outer peripheral area SA is set as a working target area CA. FIG. 2 shows examples of the outer peripheral area SA and the working target area CA.

At this time, the driver drives the combine harvester for two or three laps around the field in order to secure an outer peripheral area SA with a certain width. In this travel, the width of the outer peripheral area SA is expanded by the work width of the combine harvester each time the combine harvester makes a lap. After the first two- or three-lap travel has finished, the width of the outer peripheral area SA is two or three times larger than the work width of the combine harvester. This circulating travel may be performed as automatic travel based on data of the external shape of the farm field given in advance.

The outer peripheral area SA is used as a space in which the combine harvester changes its direction when harvesting travel is performed in the working target area CA. Also, the outer peripheral area SA is used as a space for movement in which the combine harvester moves to a grain discharge site or a fueling site after the harvesting travel has once finished.

It should be noted that a conveyance vehicle CV shown in FIG. 2 can collect grains to be discharged from the combine harvester and convey it. When grains are to be discharged, the combine harvester moves to the vicinity of the conveyance vehicle CV, and then the grains are discharged to the conveyance vehicle CV using the grain discharge apparatus 18.

Figure 3:
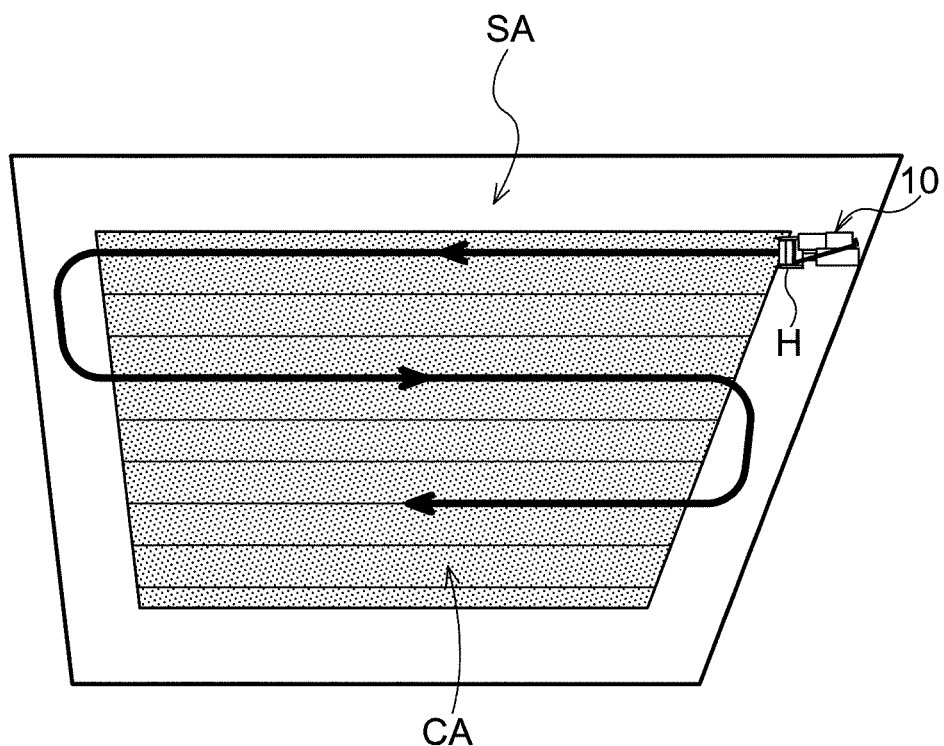
FIG. 3 is a diagram showing a travel route for the automatic traveling.
Figure 4:
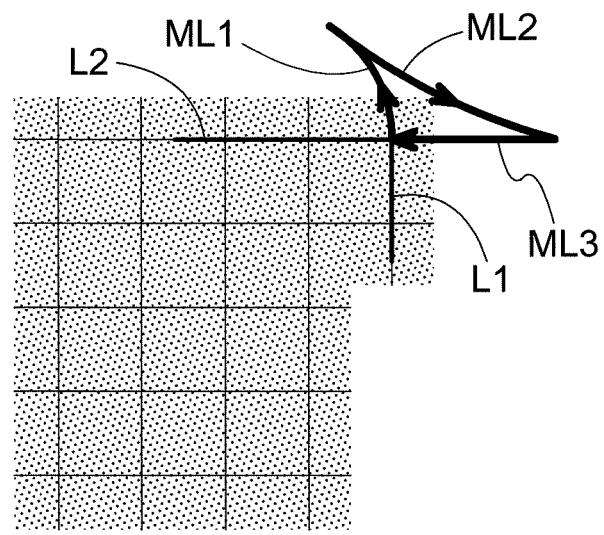
FIG. 4 is a diagram showing an example of a turning travel route in which rearward traveling needs to be performed.
Figure 5:
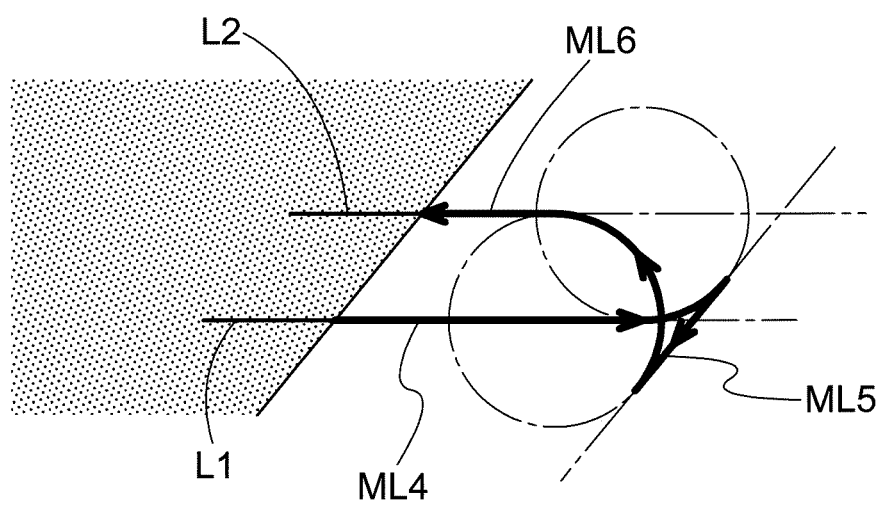
FIG. 5 is a diagram showing an example of a turning travel route in which rearward traveling needs to be performed.

After the outer peripheral area SA and the working target area CA have been set, a travel route in the working target area CA is calculated as shown in FIG. 3. Travel routes are successively calculated and set based on work travel patterns, and the combine harvester automatically travels along the set travel route. It should be noted that, as turning patterns for turning travel, this combine harvester has a U-turning pattern as shown in FIG. 3 with which the combine harvester changes its direction along a U-shaped turning travel route, an a-turning pattern as shown in FIG. 4 with which the combine harvester changes its direction while repeating forward travel and rearward travel, and a switchback turning pattern including rearward travel as shown in FIG. 5 with which the combine harvester changes its direction in a narrower area compared with the U-turning pattern, in the same manner as in the U-turning pattern. FIG. 4 shows a turning travel route with a 90° quick turn as the a-turning pattern. In this turning travel including a quick turn, the route starts with a pre-transition travel route L1 and reaches a post-transition travel route L2 via a forward travel route ML1, a rearward travel route ML2, and a forward travel route ML3. FIG. 5 shows turning travel including a 180° quick turn to be used for a route transition in linearly reciprocating travel as the switchback turning pattern. Also in this turning travel including a quick turn, the route starts with a pre-transition travel route L1 and reaches a post-transition travel route L2 via a forward travel route ML4, a rearward travel route ML5, and a forward travel route ML6. Such turning travel including rearward travel is also performed when the grain tank 14 becomes full, and the combine harvester leaves the travel route in the working target area CA and to be positioned relative to the conveyance vehicle CV, for example.

Figure 6:
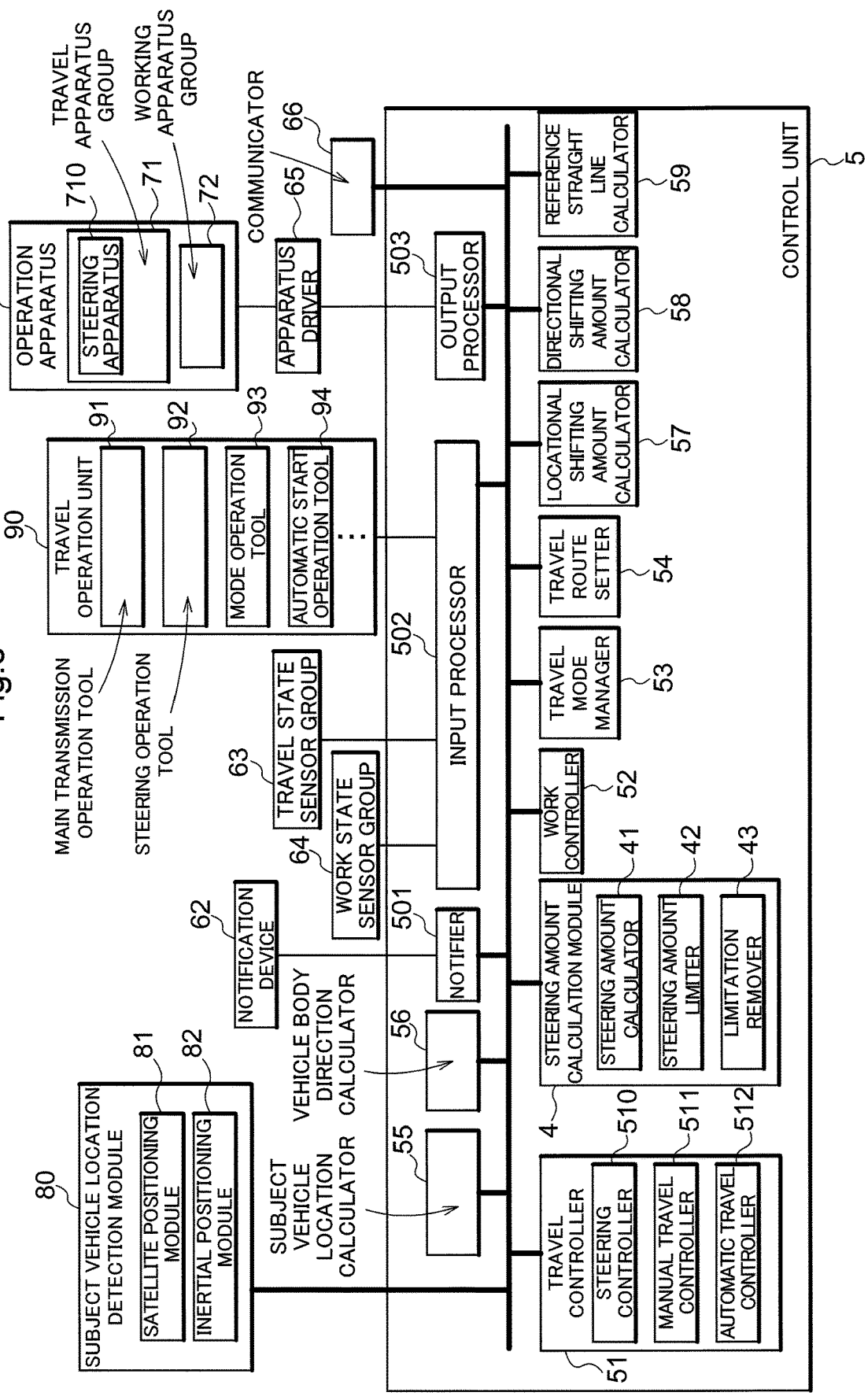
FIG. 6 is a functional block diagram showing the configuration of a control system of the combine harvester.

FIG. 6 shows a control system for a combine harvester using the automatic steering system according to the present invention. The control system for a combine harvester includes a control unit 5 including many electronic control units (referred to as "ECUs"), and various input and output apparatuses that perform signal communication (data communication) with the control unit 5 through a wiring network such as a vehicle-mounted LAN.

A notification device 62 is a device for notifying the driver or the like of a work travel state and various warnings, and examples thereof include a buzzer, a lamp, a speaker, and a display. The control system for a combine harvester uses a communicator 66 to exchange data with the communication terminal 2 or a management computer installed in a remote place. The communication terminal 2 includes a tablet computer operated by the supervisor standing in the farm field or the driver-cum-supervisor in the combine harvester, a computer installed at home or in a management office, and the like. The control unit 5 is a core component of this control system and is indicated as being an assembly of a plurality of ECUs. The signals from the subject vehicle location detection module 80 are input to the control unit 5 through the vehicle-mounted LAN.

The control unit 5 includes an output processor 503 and an input processor 502 as input and output interfaces. The output processor 503 is connected to various operation apparatuses 70 via an apparatus driver 65. A travel apparatus group 71 including travel-related apparatuses and a working apparatus group 72 including work-related apparatuses are provided as the operation apparatuses 70. The travel apparatus group 71 includes a steering apparatus 710, an engine apparatus, a transmission apparatus, and a brake apparatus, for example. The work apparatus group 72 includes power control apparatuses for the harvesting portion H, the threshing apparatus 13, the transport apparatus 16, and the grain discharge apparatus 18 (also see FIG. 1 in the description below).

A travel state sensor group 63, a work state sensor group 64, a travel operation unit 90, and the like are connected to the input processor 502. The travel state sensor group 63 includes an engine speed sensor, an overheat detection sensor, a brake pedal position detection sensor, a transmission position detection sensor, a steering position detection sensor, and the like. The work state sensor group 64 includes sensors for detecting the driving state of the harvesting apparatuses (the harvesting portion H, the threshing apparatus 13, the transport apparatus 16, and the grain discharge apparatus 18), sensors for detecting the state of grain culms and grains, and the like.

The travel operation unit 90 is a general term for operation tools that are manually operated by the driver and from which operation signals are input to the control unit 5. The traveling operation unit 90 includes a main transmission operation tool 91, a steering operation tool 92, a mode operation tool 93, an automatic start operation tool 94, and the like. In a manual travel mode, the direction of the vehicle body 10 is changed by swinging the steering operation tool 92 leftward or rightward from the neutral position to adjust the crawler speed of the left crawler mechanism and the crawler speed of the right crawler mechanism. That is, the direction of the vehicle body 10 is determined in accordance with the swinging amount of the steering operation tool 92. Accordingly, both a swinging amount with respect to the neutral position of the steering operation tool 92 and the difference in the speed between the left and right crawler mechanisms for changing the direction of the vehicle body 10 with respect to the straight-forward direction (also referred to as "neutral position") correspond to the steering amount. The same applies to automatic traveling. The travel apparatus is not limited to the crawlers, and wheels may also be used. Turning angles of the wheels also correspond to the steering amount. The mode operation tool 93 exerts a function of giving the control unit 5 an instruction for switching between an automatic travel mode in which automatic operation is executed and a manual travel mode in which manual operation is executed. The automatic start operation tool 94 exerts a function of giving the control unit 5 a final automatic start instruction for starting automatic travel. It should be noted that the transition from the automatic travel mode to the manual travel mode may be automatically performed by software regardless of the operation executed by the mode operation tool 93. For example, if a situation occurs in which automatic operation cannot be executed, the control unit 5 forcibly performs the transition from the automatic travel mode to the manual travel mode.

The control unit 5 includes a notifier 501, a travel controller 51, a work controller 52, a travel mode manager 53, a travel route setter 54, a subject vehicle location calculator 55, a vehicle body direction calculator 56, a locational shifting amount calculator 57, a directional shifting amount calculator 58, a reference straight line calculator 59, and a steering amount calculation module 4. The notifier 501 generates notification data based on instructions from the functional parts of the control unit 5, and the like, and gives the notification device 62 the notification data. The subject vehicle location calculator 55 calculates the location of the subject vehicle, which corresponds to map coordinates (or farm field coordinates) of the predetermined reference point of the vehicle body 10, based on the positioning data sent successively from the subject vehicle location detection module 80. That is, the subject vehicle location calculator 55 functions as a reference point calculator for calculating the location of the reference point of the vehicle body 10. This reference point includes a vehicle body reference point, a turning reference point, and the like, which will be described later. The vehicle body direction calculator 56 obtains a travel locus in a very short time from the location of the subject vehicle calculated successively by the subject vehicle location calculator 55 and determines the vehicle body direction that indicates the direction of the vehicle body 10 in the travel direction. The vehicle body direction calculator 56 can also determine a vehicle body direction based on the directional data included in the data output from the inertial navigation module 82.

The travel controller 51 exerts an engine control function, a steering control function, a vehicle speed control function, and the like, and gives the travel apparatus group 71 control signals. The work controller 52 gives the working apparatus group 72 control signals to control the movements of the harvesting apparatuses (the harvesting portion H, the threshing apparatus 13, the transport apparatus 16, the grain discharge apparatus 18, and the like).

A steering controller 510 included in the travel controller 51 calculates a steering amount based on the locational shifting amount calculated by the locational shifting amount calculator 57 and the directional shifting amount calculated by the directional shifting amount calculator 58, and then outputs the steering amount to the steering apparatus 710. That is, the steering controller 510 performs steering control such that the locational shifting amount and directional shifting amount between a target travel route set by the travel route setter 54 and the location of the subject vehicle calculated by the subject vehicle location calculator 55 are reduced. In this embodiment, the steering controller 510 employs a PID control method or a PI control method. It will be appreciated that another control method may also be employed. This combine harvester can travel according to both the automatic operation in which harvesting work is performed with the automatic travel and the manual operation in which harvesting work is performed with the manual travel. Accordingly, the travel controller 51 further includes a manual travel controller 511 and an automatic travel controller 512. It should be noted that the automatic travel mode is selected to perform the automatic operation, and the manual travel mode is selected to allow manual operation. As described above, the traveling mode manager 53 manages the switching of the travel mode.

When the automatic travel mode is selected, the automatic travel controller 512 cooperates with the steering controller 510 to generate control signals for automatic steering and control signals for changing the vehicle speed including those for stopping and controlling the travel apparatus group 71. At this time, the control signals relating to changing the vehicle speed are generated based on predetermined vehicle speed values. The control signals relating to the automatic steering are generated so as to correct locational shifting (including directional shifting) between the target travel route set by the travel route setter 54 and the location of the subject vehicle calculated by the subject vehicle location calculator 55.

The travel route setter 54 successively selects a travel route including a managed turning route and sets it as a target travel route. The turning route is substantially an arc of a turning circle. The arc-shaped turning route is defined by the center of the turning circle and the radius of the turning circle. If the vehicle body 10 accurately travels on the turning route, the center of the turning circle is the turning center of the vehicle body 10. Although the travel route setter 54 itself can also generate a travel route to be managed by the travel route setter 54 using a route calculation algorithm, a travel route that is generated by the communication terminal 2, a management computer in a remote place, or the like and is downloaded can also be used.

When the manual travel mode is selected, the manual travel controller 511 generates control signals based on operations executed by the driver and controls the travel apparatus group 71, and thus the manual operation is realized. It should be noted that the travel route calculated by the travel route setter 54 can be used even in the case of the manual operation for the purpose of guiding the combine harvester to travel along the travel route.

The locational shifting amount calculator 57 calculates locational shifting that is a distance between the travel route set by the travel route setter 54 and the location of the subject vehicle calculated by the subject vehicle location calculator 55. The directional shifting amount calculator 58 calculates, as directional shifting, an angle difference between the extending direction of the travel route set by the travel route setter 54 and the vehicle body direction calculated by the vehicle body direction calculator 56. It should be noted that, when the travel route is a turning travel route, the extending direction of a tangent drawn from a point on the turning travel route that is the closest to the vehicle body 10 can be considered as an imaginary extending direction of the travel route. In this embodiment, in ideal turning travel free from shifting, the location of the subject vehicle calculated by the subject vehicle location calculator 55 corresponds to the turning reference point that is on the turning route defined by the turning circle. It will be appreciated that, also in ideal traveling free from shifting on a straight-line travel route, this turning reference point is on the straight-line travel route, and therefore, the turning reference point can be used as the vehicle body reference point in a straight-line travel route. In this case, the turning reference point and the vehicle body reference point are identical.

The steering amount calculation module 4 includes a steering amount calculator 41, a steering amount limiter 42, and a limitation remover 43. The steering amount calculator 41 calculates a steering amount for correcting locational shifting and directional shifting based on the locational shifting calculated by the locational shifting amount calculator 57 and the directional shifting calculated by the directional shifting amount calculator 58. The steering amount limiter 42 limits the steering amount calculated by the steering amount calculator 41 based on the current steering amount. The limitation remover 43 exerts a function of removing the limitation applied to the steering amount by the steering amount limiter 42. The limitation remover 43 also exerts a function of removing the limitation on the steering amount and a function of outputting a vehicle speed reduction instruction for reducing the vehicle speed to the travel controller 51 at the same time.

To describe the limitation applied to the steering amount by the steering amount limiter 42, the steering amount defined herein will be described using FIG. 7 with reference to FIG. 6.

Figure 7:
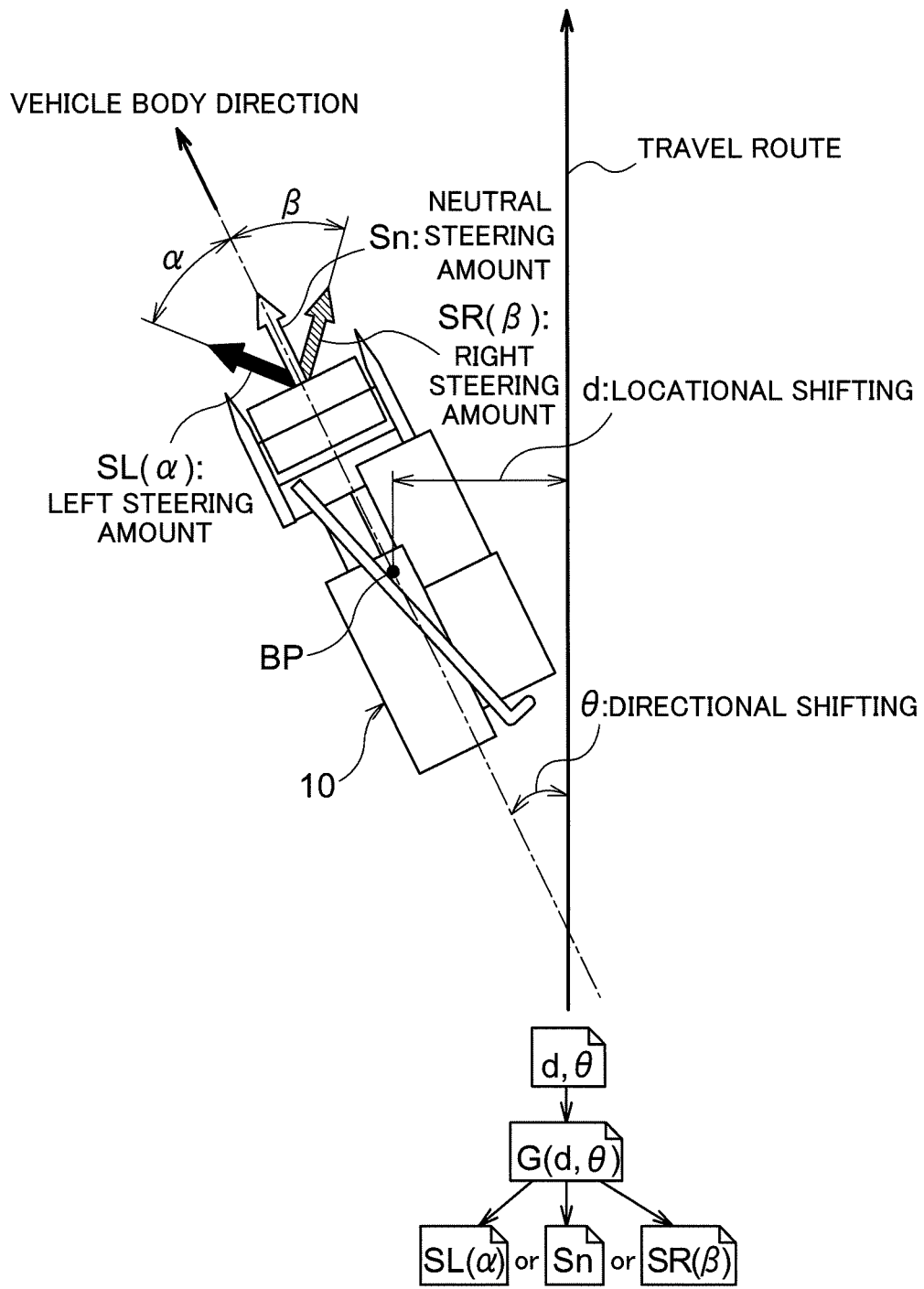
FIG. 7 is an explanatory diagram for explaining a steering amount.

First, the locational shifting is the shortest distance between a reference point BP (the vehicle body center, the position of an antenna for satellite positioning, or the like) of the vehicle body 10 and the travel route, and is denoted by d in FIG. 7. The directional shifting is an angle between a line that passes through the reference point BP and extends in the front-rear direction of the vehicle body (one-dot dash line in FIG. 7) and the travel route, and is denoted by θ in FIG. 7. A thick arrow in FIG. 7 indicates a steering direction line formed by a difference in speed between the crawler-type left travel unit and right travel unit, and corresponds to a steering amount. For example, when the left travel unit and the right travel unit are steering control wheels, the steering amount is a steering angle (turning angle), and the steering direction line is a direction line defined by the steering angle.

When the steering direction line coincides with the vehicle body direction, the steering amount (steering angle) is referred to as a "neutral steering amount Sn". In FIG. 7, a thick white arrow indicates the steering direction line indicating the neutral steering amount. In FIG. 7, a thick arrow filled with slanted lines indicates a steering direction line indicating a right steering amount. When the steering direction line is inclined to the right side with respect to the vehicle body direction, the steering amount (steering angle) is a steering amount for a rightward turn, and is referred to as a "right steering amount SRO". When the steering direction line is inclined to the left side with respect to the vehicle body direction, the steering amount (steering angle) is a steering amount for a leftward turn, and is referred to as a "left steering amount SL( )". A value indicating a gradient (steering angle) is placed in the parentheses. For example, $SL(\alpha)$ indicates a steering direction line (steering angle) inclined to the left by $\alpha°$, and $SR(\beta)$ indicates a steering direction line (steering angle) inclined to the right by $\beta°$.

Such a steering amount $SL(\alpha)$, $SR(\beta)$, or Sn is derived using the locational shifting d and the directional shifting $\theta$ as input parameters. That is, this relationship is represented by "$G(d,\theta) \rightarrow SL(\alpha)$ or $SR(\beta)$ or Sn". The neutral position steering amount Sn is a steering amount corresponding to the neutral position (straight-forward direction), and indicates a so-called zero steering angle state.

In this embodiment, the steering amount limiter 42 prohibits the steering amount calculator 41 from calculating a steering amount causing a change from one side of the left and right sides to the other side of the left and right sides over the neutral position (Sn). For example, if the current steering amount is $SL(\alpha)$, a change of the steering amount to $SR(\beta)$ over Sn (reverse steering) is prohibited. That is, there is a limitation to a change of the steering amount from $SL(\alpha)$ to Sn. Similarly, if the current steering amount is $SR(\beta)$, a change of the steering amount to $SL(\alpha)$ over Sn (reverse steering) is prohibited. That is, there is a limitation to a change of the steering amount from $SR(\beta)$ to Sn as shown in FIG. 7. Here, a is greater than 0° and smaller than or equal to the maximum steering amount (maximum steering angle), and $\beta$ is greater than 0° and smaller than or equal to the maximum steering amount (maximum steering angle).

In this embodiment, the steering amount limiter 42 has three selectable limitation modes. A first limitation mode is a mode in which the steering amount is limited only when the travel route is a turning travel route during automatic traveling. A second limitation mode is a mode in which the steering amount is limited only when the travel route is a turning travel route during automatic traveling and the subject vehicle is located inside the turning route of a turning travel route. That is, the steering amount is not limited when the subject vehicle is located outside the turning route of the turning travel route or the subject vehicle travels on a straight-forward travel route. A third limitation mode is a mode in which the steering amount is limited in all of the travel routes during automatic travel. It will be appreciated that a mode in which the steering amount is limited may also be prepared for manual travel.

The reference straight line calculator 59 shown in FIG. 6 calculates a reference straight line. The reference straight line is used in the calculation of a locational shifting amount performed by the locational shifting amount calculator 57, and in the calculation of directional shifting amount performed by the directional shifting amount calculator 58, in the case of turning travel. Next, a relationship between the reference straight line, the locational shifting amount, and the directional shifting amount will be described using FIG. 8 with reference to FIG. 6.

Figure 8:
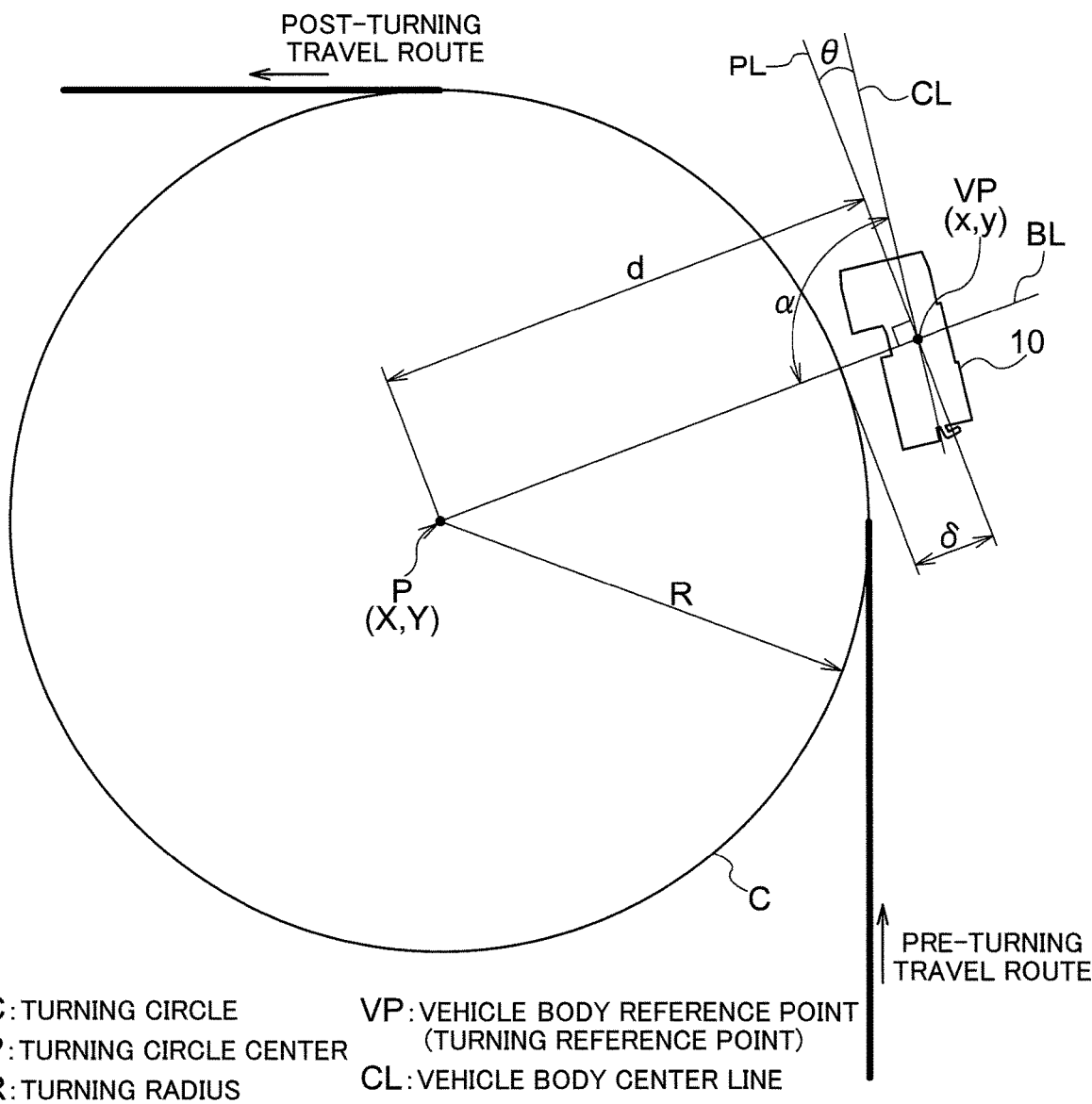
FIG. 8 is an explanatory diagram for explaining a basic principle used to calculate a locational shifting amount and a directional shifting amount.

FIG. 8 shows a relationship between the vehicle body 10 and the turning circle determined when turning travel from a pre-turning travel route that is a travel route before turning to a post-turning travel route that is a travel route after turning is performed. In this example, the pre-turning travel route and the post-turning travel route are orthogonal to each other, and therefore, the turning route is a 90°-arc of the turning circle. The reference signs used in the description of FIG. 8 are defined as follows. C indicates a turning circle. P is the center of the turning circle C. The coordinate values of the center P of the turning circle are (X,Y) and are managed by the travel route setter 54. R is the radius of the turning circle C. VP is the turning reference point (vehicle body reference point) of the vehicle body 10, and has coordinate values (x,y). The coordinate values (x,y) of the turning reference point VP are calculated by the subject vehicle location calculator 55. CL is the vehicle body center line, which is the center line extending in the front-rear direction of the vehicle body 10. d is the distance between the two points, namely the center P of the turning circle and the turning reference point VP. BL is the straight line connecting the two points, namely the center P of the turning circle and the turning reference point VP, and this straight line is the "reference straight line". PL is the straight line that passes through the turning reference point PV and is orthogonal to the reference straight line BL, and is referred to as a "directional reference line" hereinafter.

FIG. 8 shows a state in which turning travel is being performed. In FIG. 8, the location of the vehicle body 10 shifts to the outside of the turning circle C, and the vehicle body direction (vehicle body center line CL) shifts to the right side with respect to the directional reference line PL. The reference straight line calculator 59 determines the straight-line equation of a straight line connecting the two points, namely the center P of the turning circle and the turning reference point VP, and calculates the reference straight line BL. The locational shifting amount calculator 57 calculates a locational shifting amount $\delta$ by calculating the distance d between the two points, namely the center P of the turning circle and the turning reference point VP, and subtracting R from the distance d between the two points. In this subtraction, plus and minus signs are taken into account. When the value obtained by the subtraction is negative, the location of the vehicle body 10 shifts to the inside of the turning circle C, and when the value obtained by the subtraction is positive, the location of the vehicle body 10 shifts to the outside of the turning circle C. The directional shifting amount calculator 58 calculates an angle (intersection angle) between the vehicle body center line CL and the directional reference line PL as the directional shifting amount $\theta$. When the directional shifting amount $\theta$ is a positive value, the traveling direction of the vehicle body 10 shifts to the right, and when the directional shifting amount $\theta$ is a negative value, the traveling direction of the vehicle body 10 shifts to the left. As described above, the locational shifting amount $\delta$ and the directional shifting amount $\theta$ are calculated and given to the steering controller 510 in a very short travel time unit, and thus a steering amount based on the PID control or PI control is output.

The following is an example of the procedure of calculating a steering amount in turning travel.

(1) The coordinate values (x,y) of the turning reference point VP, which is the location of the vehicle body 10, is acquired from the subject vehicle location calculator 55.

(2) The straight-line equation of the reference straight line BL is determined.

(3) The distance d between the two points, namely the center P of the turning circle C and the turning reference point VP, is determined.

(4) The turning circle radius R is subtracted from the distance d between the two points, and the obtained value is taken as the locational shifting amount $\delta$.

(5) The straight-line equation of the vehicle body center line CL is determined based on the vehicle body direction determined by the vehicle body direction calculator 56.

(6) The directional reference line PL orthogonal to the reference straight line BL is calculated based on the straight-line equation of the reference straight line BL, and the angle (intersection angle) between the vehicle body center line CL and the directional reference line PL is calculated as the directional shifting amount $\theta$.

(7) 90° is subtracted from the angle $\alpha$, and the obtained value is taken as the directional shifting amount $\theta$.

(8) The steering amount is calculated from the locational shifting amount $\delta$ and the directional shifting amount $\theta$.

It should be noted that, when an intersection point at which the reference straight line BL and the turning circle C intersect each other can be easily determined, the locational shifting amount $\delta$ is obtained by computing a distance between the two points, namely the determined intersection point and the reference point VP, instead of performing the steps (3) and (4). Moreover, when the straight-line equation of a straight line that passes through the reference point and is orthogonal to the reference straight line can be easily determined, the directional shifting amount $\theta$ may be determined as follows: the angle (intersection angle) between the vehicle body center line CL and the reference straight line BL is directly determined instead of performing the step (6), and 90° is subtracted from the determined angle, and the obtained value is taken as the directional shifting amount $\theta$.

Next, countermeasures to be taken when a turning travel error occurs in the automatic steering using a turning circle will be listed.

Figure 9:
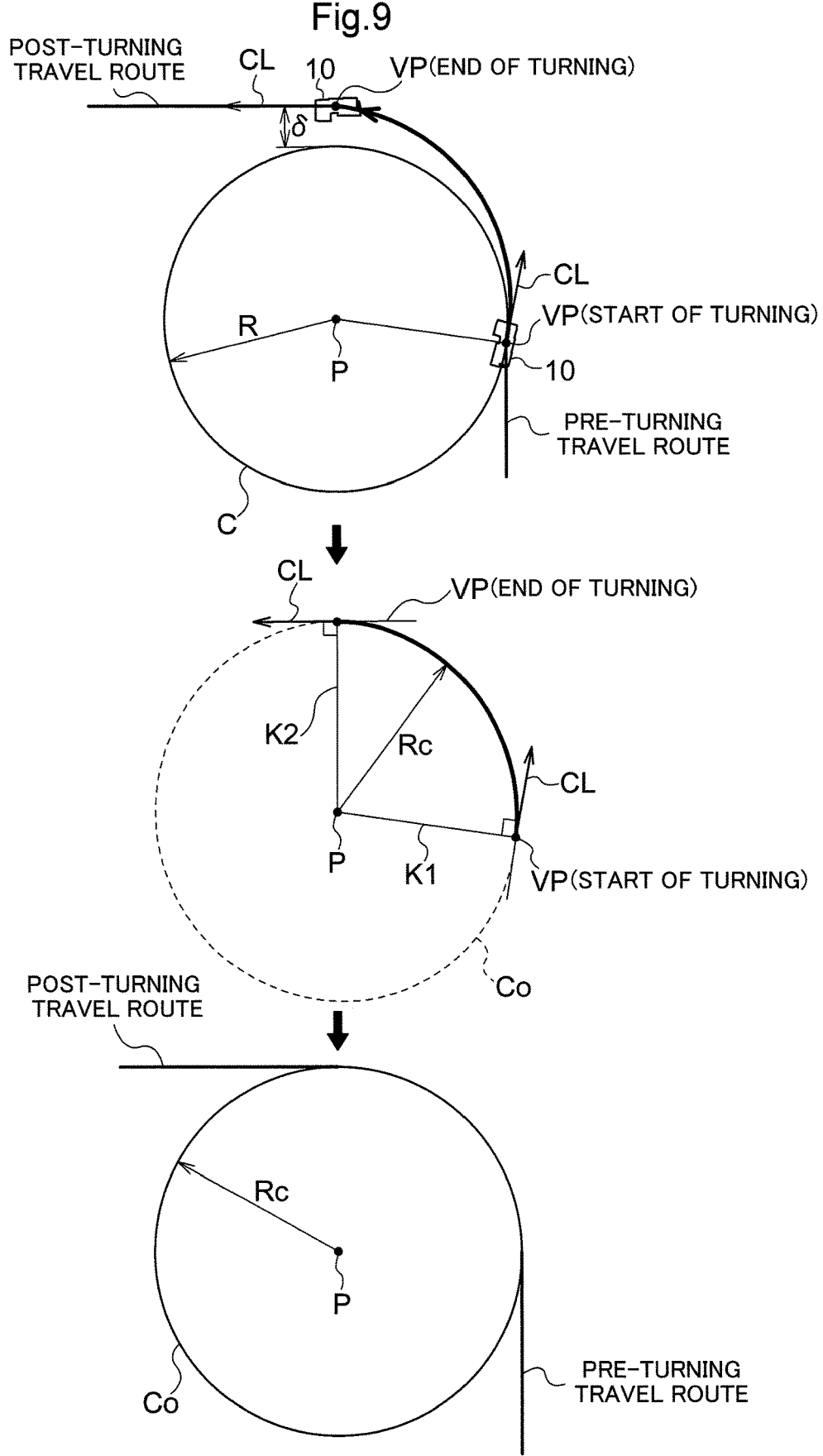
FIG. 9 is a schematic diagram showing another embodiment of the turning control.

(A) FIG. 9 shows a state in which the locational shifting amount $\delta$ is generated at the end of turning in turning travel on a predetermined turning circle C (the radius of the turning circle C is R). A plurality of reasons such as "the direction of the vehicle body 10 shifted at the start of turning" and "an actual turning radius increased due to sliding on the farm field" are conceivable as reasons for such turning shifting, and therefore, it is difficult to take decisive measures. To solve this problem, an optimized turning circle Co on which turning travel can be appropriately performed is calculated from the actual locations and directions of the vehicle body 10 at the start of turning and the end of turning. As shown in FIG. 9, the optimized turning circle having a radius Rc can be determined by determining an intersection point at which a straight line K1 that passes through the turning reference point VP and is orthogonal to the vehicle body center line CL in the vehicle body 10 at the start of turning, and a straight line K2 that passes through the turning reference point VP and is orthogonal to the vehicle body center line CL in the vehicle body 10 at the end of turning intersect each other, and determining a circle whose center is this intersection point and that passes through the turning reference point VP of the vehicle body 10 at the start of turning and the turning reference point VP of the vehicle body 10 at the end of turning. It is expected that turning shifting will be reduced in subsequent instance of turning travel as a result of setting this optimized turning circle Co.

Figure 10:
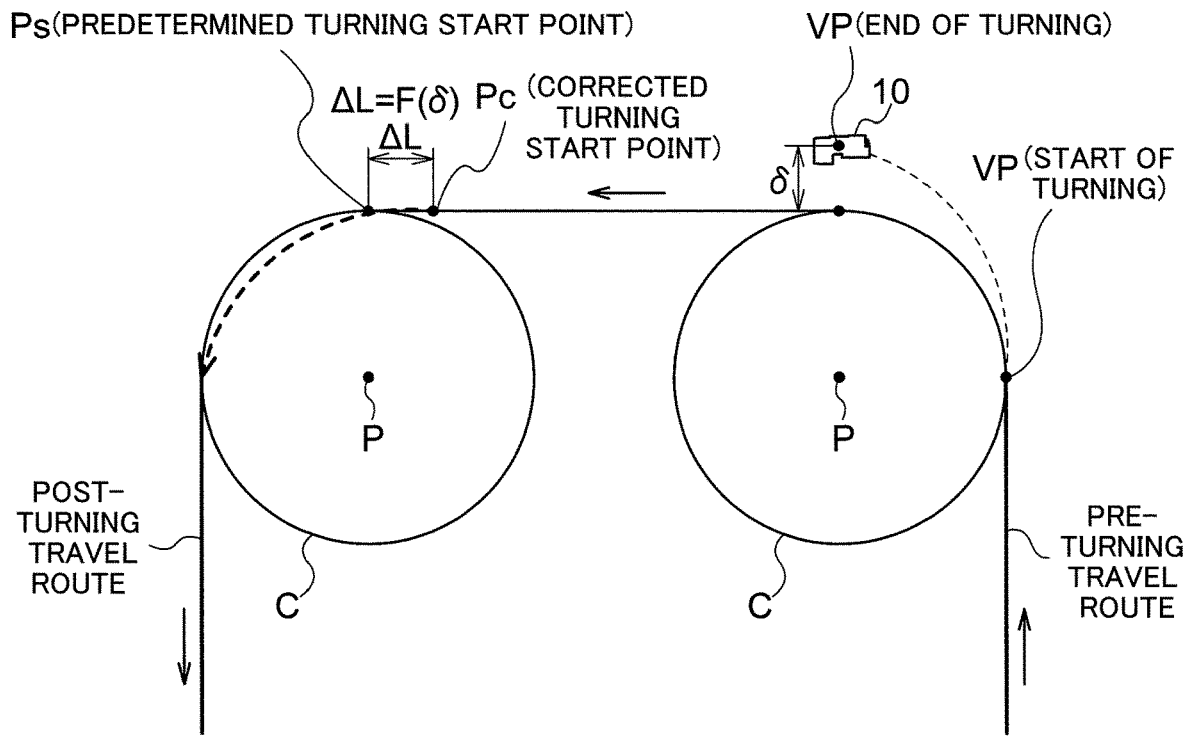
FIG. 10 is a schematic diagram showing another embodiment of the turning control.

(B) FIG. 10 shows a measure to realize turning travel in which turning shifting is further reduced by taking a turning travel error that has occurred in turning travel using a predetermined turning circle C into account in the next instance of turning travel. Here, a function F($\delta$) is used that uses the locational shifting amount $\delta$ generated in the first turning travel as an input parameter and derives a turning start point shifting amount $\Delta$L needed to eliminate the locational shifting amount $\delta$. Such a function F($\delta$) can be obtained through a simulation or an experiment. It is expected that turning shifting will be reduced in the next instance of turning travel as a result of shifting a predetermined turning start point Ps of the next turning route to a corrected turning start point Pc by the shifting amount $\Delta$L derived by the function F($\delta$).

Figure 11:
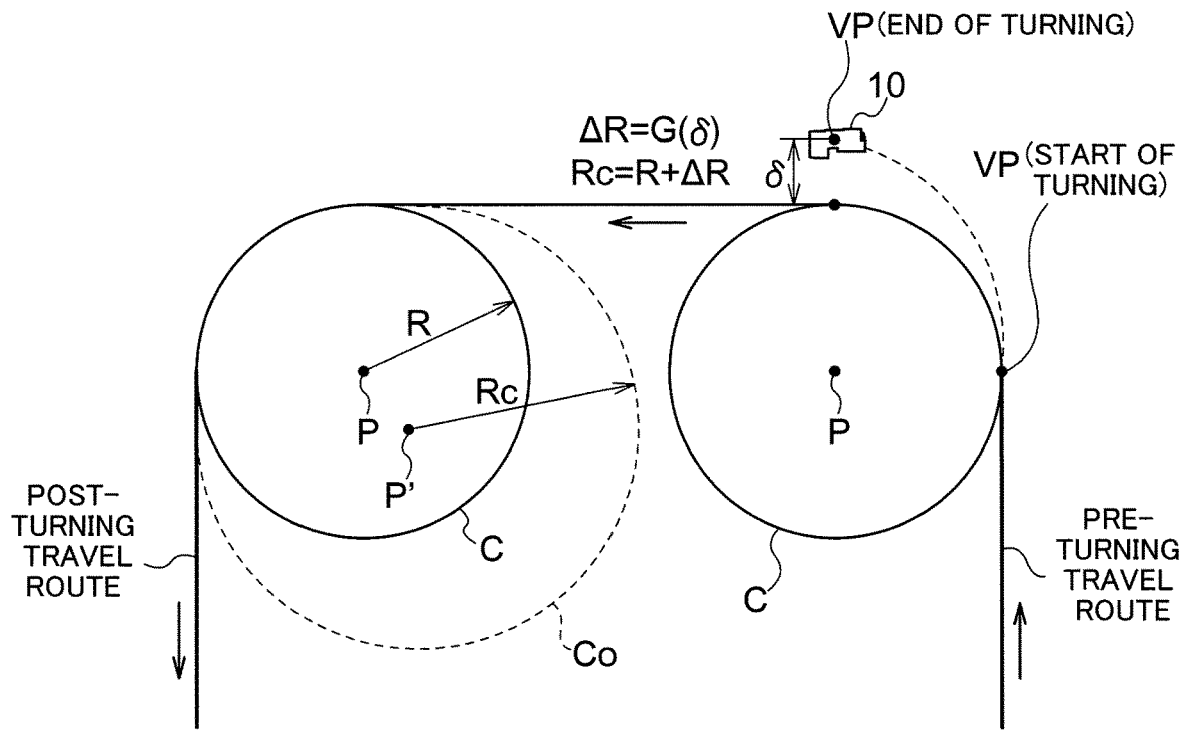
FIG. 11 is a schematic diagram showing another embodiment of the turning control.

(C) FIG. 11 shows an improvement measure against turning shifting that is similar to the improvement measure against turning shifting shown in FIG. 10. Here, a function G($\delta$) is used that uses the locational shifting amount $\delta$ generated in the first turning travel as an input parameter and derives an adjustment amount $\Delta$R for the radius of the turning circle needed to eliminate the locational shifting amount $\delta$. Such a function G($\delta$) can also be obtained through a simulation or an experiment. In the next instance of turning travel, an optimized turning circle Co having a radius Rc that is adjusted by the adjustment amount $\Delta$R derived by the function G($\delta$) is used instead of the turning circle C. At this time, the center P of the turning circle moves to a new center P'. It is expected that turning shifting will be reduced as a result of using this optimized turning circle Co.

(D) FIG. 12 is a diagram for describing a measure to realize turning travel in which turning shifting is further reduced by using a directional shifting amount $\theta$s of the vehicle body 10 at the start of turning and a directional shifting amount $\theta$e of the vehicle body 10 at the end of turning to adjust a turning circle to be used in the next instance of turning travel when a turning travel error occurs in turning travel using a predetermined turning circle C. To achieve this, here, a function J($\theta$s,$\theta$e) is used that uses the directional shifting amount $\theta$s at the start of turning and the directional shifting amount $\theta$e at the end of turning as input parameters and derives an adjustment amount $\Delta$R for the radius of the turning circle C needed to correct the turning shifting. Such a function J($\theta$s,$\theta$e) can also be obtained through a simulation or an experiment. In the next instance of turning travel, it is expected that turning shifting will be reduced as a result of using an optimized turning circle Co having a radius Rc that is adjusted by the adjustment amount $\Delta$R derived by the function J($\theta$s,$\theta$e) used instead of the turning circle C.

(E) It is empirically known that an actual turning radius based on the turning locus of the combine harvester varies depending on the amount of grain stored in the grain tank 14. Such a turning travel error that occurs depending on a stored grain amount V can be corrected by setting a turning circle whose radius is adjusted in accordance with the stored grain amount V. To achieve this, a function H(V) is used that uses the stored grain amount V as an input parameter and derives an adjustment amount $\Delta$R for the radius of the turning circle. At this time, it is preferable that the adjustment amount $\Delta$R when V is 0 is set to 0, and the adjustment amount to the maximum volume is gradually increased.

It should be noted that, in the measures (A) to (E) described above, it is supposed that the turning circle in which turning shifting has occurred and a turning circle along which turning travel is subsequently performed have the same radius, but, when the above-described measures are applied to turning circles having different radii, problems posed by such a difference in the radius between the turning circles can be solved by a preformed correction factor table for correcting the difference in the radius.

Other Embodiments

Hereinafter, other embodiments will be described. In the descriptions below, the reference signs in FIGS. 1 to 12 used in the descriptions above are used.

(1) There is no limitation on the configuration in which the hardware carries out the control operations performed by the control unit 5, such as control of a mode change, and a configuration may also be employed in which software carries out the control operations. Moreover, a configuration may also be employed in which the control operations are carried out by executing a program that specifies the control operations. In this case, the program is stored in a storage device (not shown) and executed by a CPU or an ECU (not shown).

(2) In the above-described embodiment, the steering amount limiter 42 prohibits a steering amount causing a change from one side of the left and right sides to the other side of the left and right sides over the neutral position. Instead, a configuration may also be employed in which the current steering amount is prohibited from exceeding a predetermined value. Furthermore, a configuration may also be employed in which a lookup table for deriving an allowable steering amount range using a current operation amount as an input parameter is provided, and steering amounts out of the derived allowable steering amount range are prohibited.

(3) In the above-described embodiment, the turning circle used for turning travel is included in a travel route generated on the farm field by a travel route generation algorithm or artificially, and is successively set as a target travel route during travel by the travel route setter 54. The example has also been described in which the radius of the turning circle is automatically changed at that time based on the occurrence of turning shifting. In addition, a configuration may also be employed in which the radius of the turning circle is artificially changed. For example, an artificial operation tool may also be provided in which a turning mode can be selected from a plurality of turning modes such as a "slow mode" in which a turning circle having a large radius (turning circle for slow turning) is set and a "high-speed mode" in which a turning circle having a small radius (turning circle for quick turning) is selected. When the "slow mode" is selected, turning with which damage to the farm field is suppressed as much as possible is realized, and when the "high-speed mode" is selected, a period of time during which turning travel is reduced, and thus the working time is reduced. It should be noted that an actual turning radius of the vehicle body 10 is determined in accordance with a difference in the crawler speed between the left and right crawler mechanisms or a difference in speed between the left and right driving wheels, but it is also possible to adjust the turning radius by adjusting the hydraulic pressure in a hydrostatic power transmission mechanism that transmits traveling power to the crawler mechanisms or driving wheels.

(4) In the above-described embodiment, the satellite navigation module 81 and the inertial navigation module 82 are used in combination as the subject vehicle location detection module 80, but only the satellite navigation module 81 may be used. Moreover, a method for calculating the location of the subject vehicle or the vehicle body direction based on images taken by a camera may also be employed.

(5) The functional parts shown in FIG. 6 are classified mainly for the sake of explanation. In practice, each of the functional parts may be integrated with another functional part or divided into a plurality of functional parts. Furthermore, a configuration may also be employed in which all or a portion of the traveling mode manager 53, the travel route setter 54, the locational shifting amount calculator 57, the directional shifting amount calculator 58, the reference straight line calculator 59, and the steering amount calculation module 4 out of the functional parts built in the control unit 5 are built in a portable communication terminal 2 (e.g., tablet computer) that is connectable to the control unit 5, and exchange data with the control unit 5 via wireless LAN or vehicle-mounted LAN.

The configuration disclosed in the embodiment described above (including the alternative embodiments; the same applies to the following) can be applied in combination with configurations disclosed in the other embodiments as long as no contradiction arises. Also, the embodiments disclosed in this specification are illustrative, embodiments of the present invention are not limited to the disclosed embodiments, and appropriate modifications can be made without departing from the object of the present invention.

INDUSTRIAL APPLICABILITY

The present invention can be applied to not only a normal combine harvester but also a head-feeding combine harvester.

The present invention can also be applied to farm field work vehicles such as various harvesters (e.g., a corn harvester, a potato harvester, a carrot harvester, and a sugar cane harvester), a rice transplanter, and a tractor. Furthermore, the present invention can also be applied to a lawn mower and construction equipment.

DESCRIPTION OF REFERENCE SIGNS

5: Control unit
10: Vehicle body (traveling vehicle body)
11: Travel apparatus
51: Travel controller
510: Steering controller
511: Manual travel controller
512: Automatic travel controller
52: Work controller
53: Travel mode manager
54: Travel route setter
55: Subject vehicle location calculator
56: Vehicle body direction calculator
57: Locational shift amount calculator
58: Directional shift amount calculator
59: Reference straight line calculator
80: Subject vehicle location detection module
81: Satellite navigation module
82: Inertial navigation module
BL: Reference straight line
C: Turning circle
CL: Vehicle body center line
PL: Directional reference line R: Radius of turning circle
VP: Turning reference point (reference point)
δ: Locational shift amount
θ: Directional shift amount

The invention claimed is:

1. An automatic steering system for a work vehicle that automatically travels along a predetermined travel route on a work site, comprising:
   a steering travel apparatus for performing leftward turning based on a leftward steering amount with respect to a straight-forward direction and performing rightward turning based on a rightward steering amount with respect to the straight-forward direction;
   a subject vehicle location calculator for calculating a location of a subject vehicle;
   a locational shifting calculator for calculating locational shifting from the travel route and the location of the subject vehicle;
   a vehicle body direction calculator for calculating a vehicle body direction that indicates a direction of a vehicle body;
   a directional shifting calculator for calculating directional shifting from the travel route and the vehicle body direction;
   a steering amount calculator for calculating a first steering amount, which is the steering amount for correcting the locational shifting and the directional shifting, based on the locational shifting and the directional shifting; and
   a steering amount limiter for limiting the first steering amount based on a second steering amount, the second steering amount being a steering amount at present,
   wherein:
      in response to the second steering amount being the leftward steering amount, the steering amount limiter limits the first steering amount to the leftward steering amount and a neutral steering amount, and
      in response to the second steering amount being the rightward steering amount, the steering amount limiter limits the first steering amount to the rightward steering amount and the neutral steering amount.

2. The automatic steering system according to claim 1, wherein the first steering amount is limited by the steering amount limiter when the travel route is a turning travel route.

3. The automatic steering system according to claim 2, wherein the first steering amount is limited by the steering amount limiter when the location of the subject vehicle is present inside a turning route of the turning travel route, and the first steering amount is not limited by the steering amount limiter when the location of the subject vehicle is present outside the turning route of the turning travel route.

4. The automatic steering system according to claim 1, comprising a limitation remover for removing a limitation applied to the first steering amount by the steering amount limiter, wherein the limitation remover removes the limitation on the first steering amount and outputs a vehicle speed reduction instruction at the same time.

5. The automatic steering system according to claim 1, wherein the steering travel apparatus includes a left travel unit and a right travel unit whose speeds can be independently adjusted, and the steering amount is a difference in speed between the left travel unit and the right travel unit.

6. An automatic steering method for a work vehicle that automatically travels along a predetermined travel route on a work site, comprising:
   a step of calculating a location of a subject vehicle;
   a step of calculating locational shifting from the travel route and the location of the subject vehicle;
   a step of calculating a vehicle body direction that indicates a direction of a vehicle body;
   a step of calculating directional shifting from the travel route and the vehicle body direction;
   a step of calculating a first steering amount, which is a steering amount for correcting the locational shifting and the directional shifting, based on the locational shifting and the directional shifting;
   a step of limiting the first steering amount based on a second steering amount, the second steering amount being a steering amount at present; and
   a step of steering the work vehicle in accordance with the limited first steering amount;
   wherein, when the first steering amount is limited,
      the first steering amount is limited to a leftward steering amount and a neutral steering amount in response to the second steering amount being the leftward steering amount, and
      the first steering amount is limited to a rightward steering amount and the neutral steering amount in response to the second steering amount being the rightward steering amount.

7. The automatic steering method according to claim 6, wherein the step of limiting the first steering amount is performed when the travel route is a turning travel route.

8. The automatic steering method according to claim 7, wherein the first steering amount is limited when the location of the subject vehicle is present inside a turning route of the turning travel route, and the first steering amount is not limited when the location of the subject vehicle is present outside the turning route of the turning travel route.

9. The automatic steering method according to claim 6, wherein removing a limitation on the first steering amount and outputting a vehicle speed reduction instruction are performed at the same time.

\* \* \* \* \*